United States Patent
Rimpel

(10) Patent No.: US 9,651,086 B2
(45) Date of Patent: May 16, 2017

(54) BRUSH DAMPER RINGS FOR RADIAL FLUID BEARING

(71) Applicant: Southwest Research Institute, San Antonio, TX (US)

(72) Inventor: Aaron M Rimpel, San Antonio, TX (US)

(73) Assignee: SOUTHWEST RESEARCH INSTITUTE, San Antonio, TX (US)

(*) Notice: Subject to any disclaimer, the term of this patent is extended or adjusted under 35 U.S.C. 154(b) by 41 days.

(21) Appl. No.: 14/713,049

(22) Filed: May 15, 2015

(65) Prior Publication Data

US 2016/0333927 A1    Nov. 17, 2016

(51) Int. Cl.
*F16C 32/06* (2006.01)
*F16C 27/02* (2006.01)
*F16C 17/02* (2006.01)
*F16C 17/03* (2006.01)
*F16C 33/10* (2006.01)

(52) U.S. Cl.
CPC .......... *F16C 27/02* (2013.01); *F16C 17/024* (2013.01); *F16C 17/03* (2013.01); *F16C 33/1005* (2013.01); *F16C 2360/00* (2013.01)

(58) Field of Classification Search
CPC ...... F16C 17/024; F16C 17/03; F16C 17/035; F16C 27/02; F16C 32/0603
See application file for complete search history.

(56) References Cited

U.S. PATENT DOCUMENTS

| | | | | |
|---|---|---|---|---|
| 5,026,252 | A * | 6/1991 | Hoffelner | F16J 15/441 277/355 |
| 5,911,511 | A * | 6/1999 | Saville | F16C 17/024 384/103 |
| 6,558,041 | B2 | 5/2003 | Laos et al. | |
| 7,410,173 | B2 * | 8/2008 | Justak | F16J 15/3288 277/355 |
| 8,083,413 | B2 | 12/2011 | Ertas | |

* cited by examiner

*Primary Examiner* — James Pilkington
(74) *Attorney, Agent, or Firm* — Livingston Law Firm

(57) ABSTRACT

A bearing assembly for a rotating shaft, with brush rings on both sides of the bearing mechanism for damping bearing motion. In a foil gas bearing embodiment, the bearing itself comprises a hollow sleeve, a compliant layer, and a top foil layer. These bearing elements are arranged in a conventional manner except that the top foil layer extends beyond the sleeve. A sleeve extension extends over the extended portion of the top foil layer. Two opposing brush rings, an inner brush ring and an outer brush ring, are attached to the top foil layer extension and the sleeve extension, respectively. The bristles of an inner brush ring and the bristles of an outer brush ring are interposed and provide damping during operation of the bearing.

14 Claims, 7 Drawing Sheets

BRUSH DAMPER RINGS FOR RADIAL FLUID BEARING

TECHNICAL FIELD OF THE INVENTION

This invention relates to radial fluid bearings for axial rotation, and more particularly to mechanisms for damping the bearing motion during operation.

BACKGROUND OF THE INVENTION

Given its most general meaning, a mechanical "bearing" is a machine element that constrains relative motion between moving parts to allow only a desired motion. As examples, a bearing might allow linear motion of a moving part or a free rotation around a fixed axis. Many bearings also have means to facilitate the desired motion by minimizing friction.

Bearings may be classified according to the type of operation, the motions allowed, or the directions of the loads (forces) applied to the parts. There are many types of bearings, with varying shapes, materials, lubrications, and principles of operation.

If classified by principle of operation, the simplest type of bearing is a plain bearing. A plain bearing may be simply a cylindrical bearing surface of a bore with a shaft passing through it, or of a planar surface that bears another. In the absence of lubricant, the opposing bearing surfaces are in contact, and the friction force is influenced by the tribological properties of the materials. With the presence of a fluid lubricant (e.g., oil), relative motion of the bearing surfaces causes the lubricant to shear, which generates hydrodynamic pressure that, with sufficient relative velocity, allows a thin film of the lubricant to support the force between the shaft and bearing (i.e., they are no longer in contact). The lubricant may also be a solid film (e.g., graphite), and the shearing of the solid lubricant also prevents the two bearing surfaces from being in contact.

Other common types of bearings are rolling-element bearings, magnetic bearings, and various types of fluid bearings. With rolling-element bearings, the load is carried by a ring of balls or by rollers. With a magnetic bearing, the load is carried by a magnetic field. Fluid bearings can be categorized as either hydrostatic or hydrodynamic. Hydrostatic fluid bearings use an externally pressurized gas or liquid flowing into the thin film between bearing surfaces to support the load. Hydrodynamic fluid bearings, or so-called self-acting bearings, develop the load-bearing pressure within the gas or liquid film through the relative motion of the bearing surfaces. Some fluid bearings may also rely on a combination of hydrostatic and hydrodynamic pressure development. Fluid bearings can be in a wide range of configurations from plain bearings to tilting pad bearings to foil bearings.

FIGS. 1 and 2 are a perspective view and a front view, respectively, of a rotating shaft having a conventional foil gas bearing. FIG. 3 is a cross-sectional view along section line 3-3 of FIG. 2.

A shaft 11 rotates freely in a supporting sleeve 13. Sleeve 13 typically has a cylindrical inner surface, but other geometries are possible, such as a variable radius with multiple lobes.

A top foil layer 15 is supported by a "bump" foil layer 16. The bump foil layer 16 is the compliant layer. Other foil bearing designs have been devised which incorporate different compliant structures, such as leaf-type springs, metal meshes, and elastomeric elements, and those which incorporate multiple, separate top foils and various foil retention features. FIGS. 1-3 and 5-8 depict a bump foil structure with a single top foil for the purposes of example without excluding the applicability of the invention, described below, to all types of foil gas bearings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Figure 1:
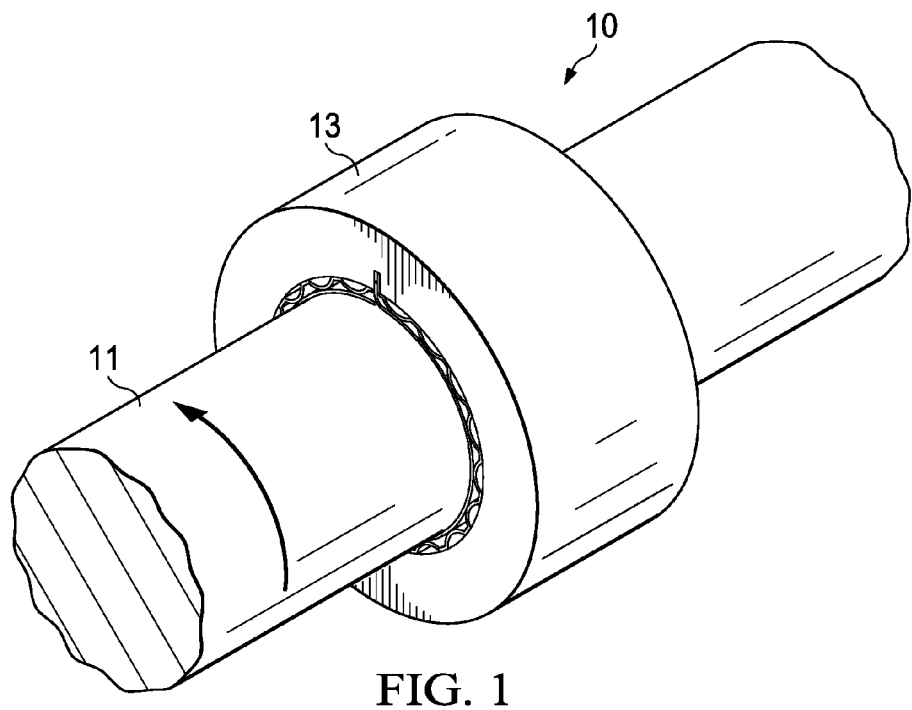
FIG. 1 is a perspective view of a rotating shaft having a conventional foil gas bearing.

The following description is directed to a damping mechanism for bearings that support axial rotation (also referred to as radial or journal bearings). That is, the radial bearing mechanism itself has at least a supporting metal sleeve, within which a journal (shaft) rotates.

As indicated in the Background, fluid bearings are bearings that use a film of liquid or gas between the bearing surfaces, in which pressure to support the load may be generated hydrostatically or hydrodynamically or some combination of both. Fluid bearings are frequently used in high load, high speed, or high precision applications where ordinary ball bearings would have a short life or cause high noise. Furthermore, rotating machinery shafts are often subjected to various destabilizing forces (e.g., cross-coupled stiffness forces from bearings, seals, and aerodynamic elements such as axial and centrifugal compressor and turbine stages) which require energy dissipation via damping to prevent rotordynamic instability. Bearings are primary locations where this damping takes place. Typically, gas fluid bearings have less relative damping within the fluid film than oil fluid bearings since most gases have lower viscosity than oil, and gas bearings operate with smaller film thicknesses.

Gas bearings are an attractive option for micro-turbomachinery due to low static load requirements, higher journal surface speed limits than rolling element bearings, lower power consumption than oil-lubricated bearings, and simpler and more-compact machine design. Because the process gas serves as the lubricant in gas bearing machines, no seals and ancillary hardware are required to separate the process gas from the bearings. However, as mentioned above, one drawback is that the fluid film of a gas bearing has relatively low damping compared to the fluid film in oil bearings. Thus, gas bearing designs tend to incorporate mechanical damping structures that rely on Coulomb friction.

A common type of gas bearing is a foil gas bearing. A rotating shaft is supported by a compliant, spring-loaded foil lining. During rotation of the shaft, hydrodynamic pressure is generated in the thin gas film which separates the foil lining and the shaft surface. The compliant foil allows the bearing surface to conform to the motion of the shaft during operation.

Once the shaft 11 is spinning fast enough, the gas film generates sufficient hydrodynamic pressure and pushes the top foil 15 away from the shaft 11 so that there is no contact.

In this manner, the bearing's dynamic response is influenced by the properties of a gas film in series with the properties of the bump foil layer 16. The gas film's stiffness increases with increasing shaft speed and can exceed the stiffness of the compliant structure. Therefore the bearing's equivalent stiffness and damping properties can become more strongly dependent on the compliant bump foil layer 16.

The "bumps" of the bump foil layer 16 can have various geometries. A more general description might be that this compliant layer 16 is "corrugated", i.e., having alternating ridges (bumps) and grooves. In addition to providing stiffness, these structures also contribute friction damping due to relative motions of their related structures when subjected to dynamic loading.

Figure 2:
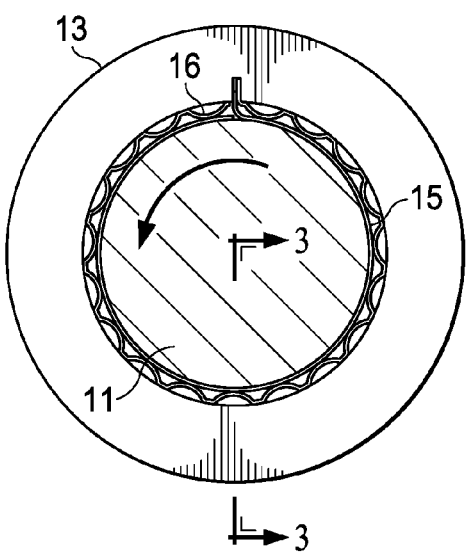
FIG. 2 is a front view of the bearing of FIG. 1.
Figure 2A:
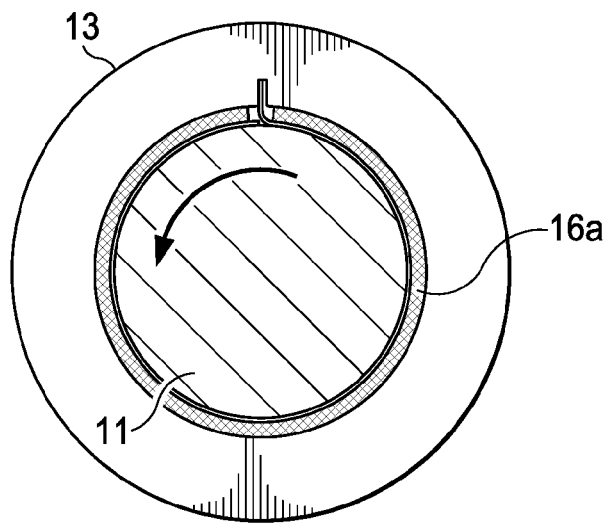
FIG. 2A illustrates a foil gas bearing having a metal mesh layer as the compliant structure.
Figure 2B:
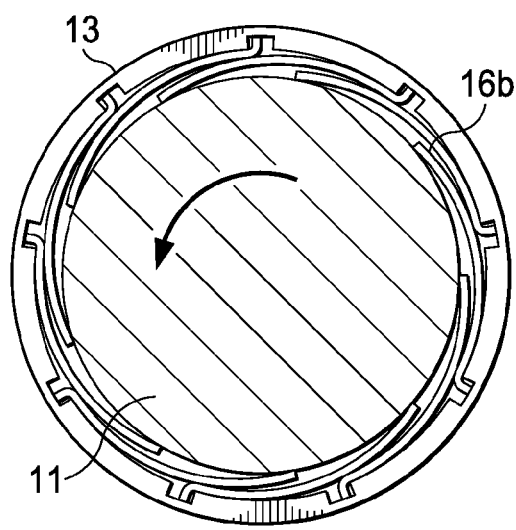
FIG. 2B illustrates a foil gas bearing having a leaf foil layer as the compliant structure
Figure 3:
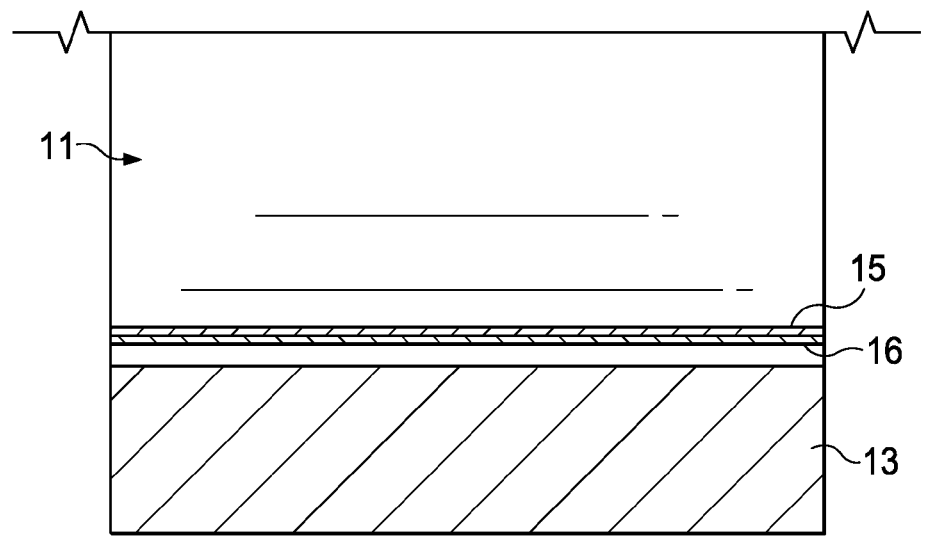
FIG. 3 is a cross-sectional view along section line 3-3 of FIG. 2.
Figure 4:
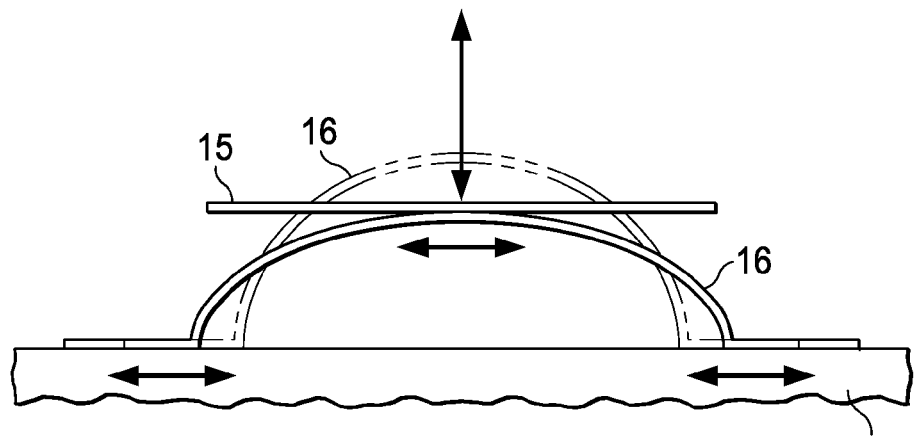
FIG. 4 illustrates the damping mechanics of a bump foil gas bearing.

FIG. 4 illustrates the compliant mechanics of the bump foil layer 16 of a bump foil gas bearing. A portion (the region of one bump) of the foil layers 15 and 16 of FIGS. 1-3 is shown. As indicated by the horizontal arrows, radial shaft motion causes tangential motion of the bump foil contacts with respect to the bearing sleeve 13 and top foil layer 15, which dissipate energy due to friction. Several factors influence the amount of energy dissipation (i.e., damping) that can be achieved with this mechanism: friction coefficients between the contact surfaces (material properties and surface finish), amplitudes of the motion for the sliding interfaces, contact area, and normal forces of the contacts. Besides the friction coefficient, these factors are mainly a function of the geometry of the bump foil, and qualitatively, the increase in these factors would also result in higher stiffness in most cases. As a result, in terms of effective damping ratio, the additional damping would be countered by the increase in stiffness. Other existing compliant structures for foil gas bearings, such as leaf springs or metal meshes, also have varying degrees of this characteristic where the stiffness and damping properties are coupled.

As explained below, the damping mechanism in accordance with the invention is a pair of interposed ring-shaped brushes, attached to surfaces with relative motion. The brushes' numerous bristles interlock and provide damping via friction as the opposing brushes vibrate during bearing operation. For purposes of example, the bearing that is the subject of FIGS. 5-9 is a foil gas bearing. However, as explained below in connection with FIG. 10, the damping mechanism in accordance with the invention is suitable for use with other types of bearings.

Figure 5:
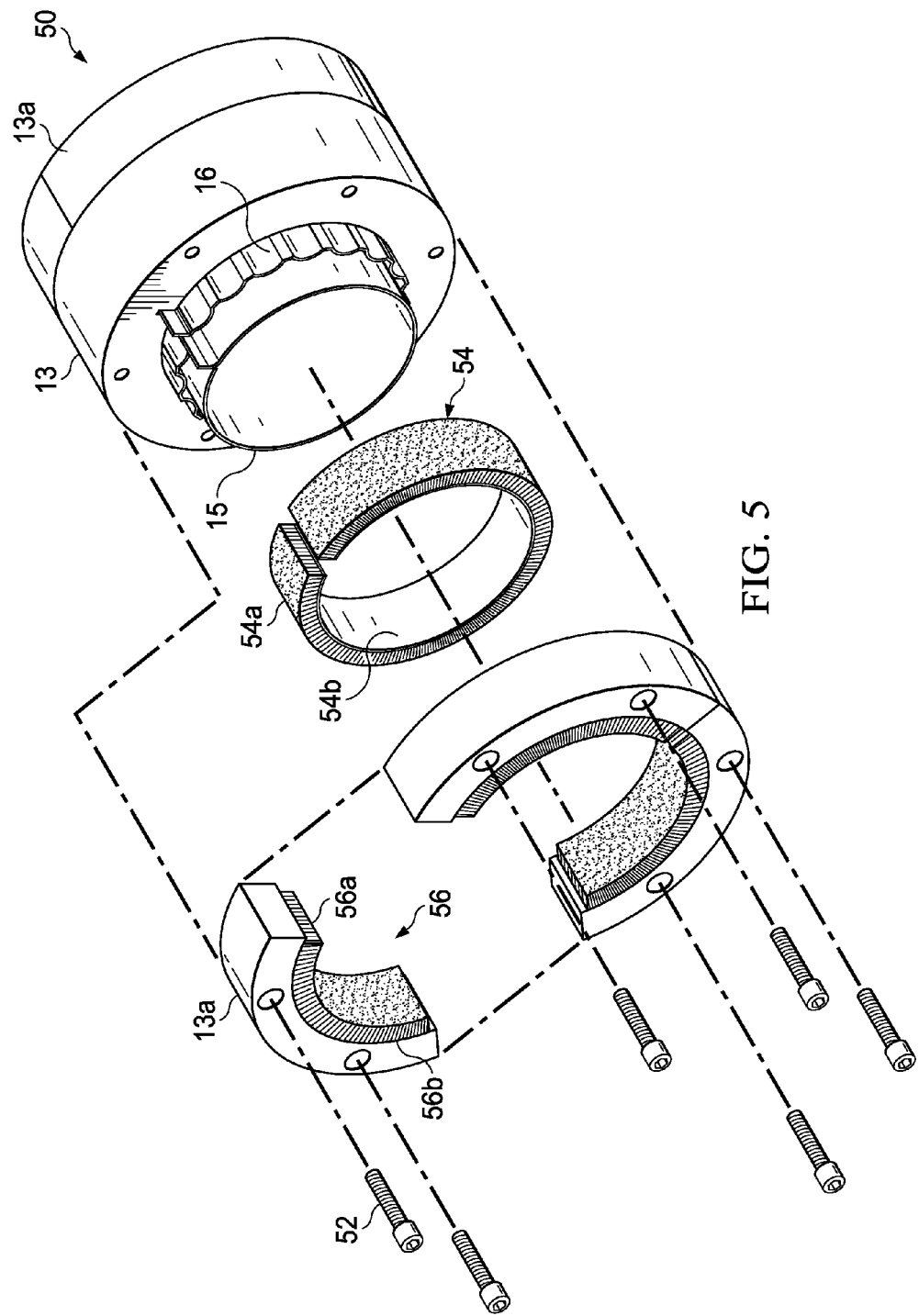
FIG. 5 is an exploded view of a foil gas bearing, modified to incorporate brush damper rings in accordance with the invention.
Figure 6:
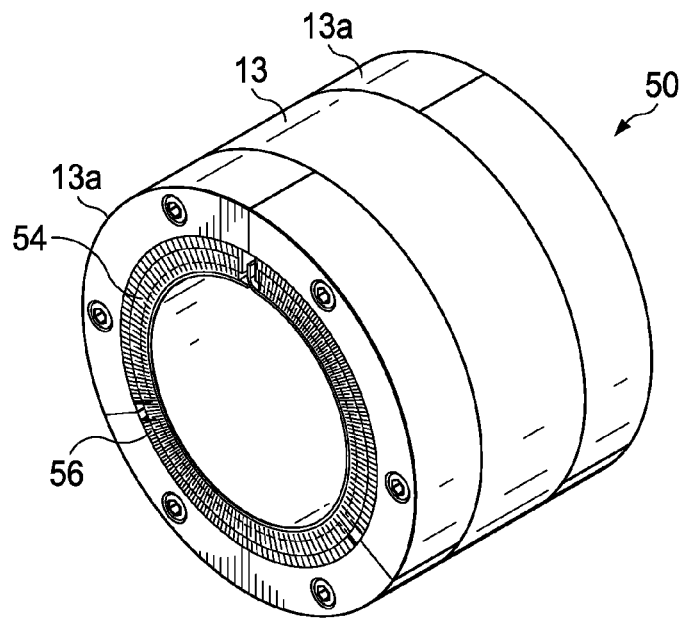
FIG. 6 is a perspective view of the bearing and brush rings of FIG. 5.
Figure 7:
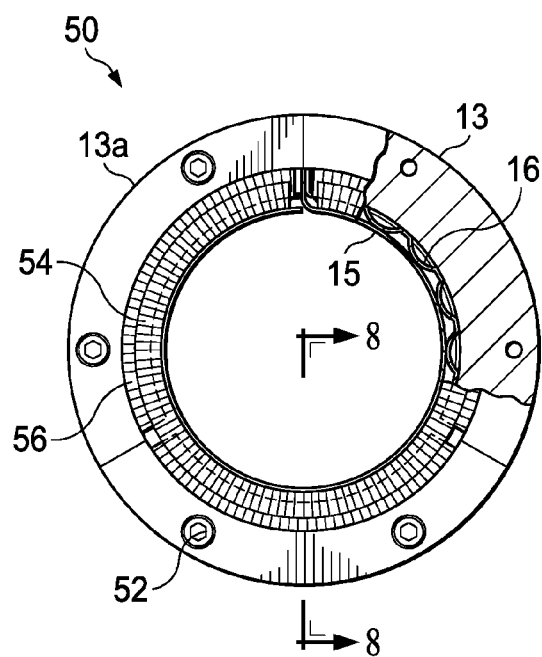
FIG. 7 is a front view of the bearing and brush rings of FIG. 6.
Figure 8:
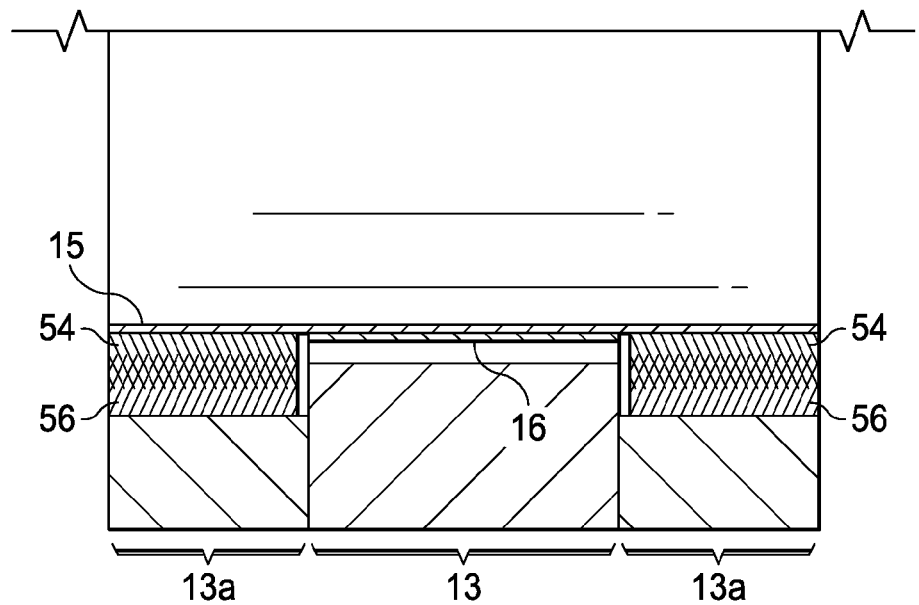
FIG. 8 is a cross-sectional view along section line 8-8 of FIG. 7.

FIG. 5 is an exploded view of a bump foil gas bearing assembly 50, modified to incorporate damper brush rings 54 and 56 in accordance with the invention. FIGS. 6 and 7 are a perspective view and a front view of the gas foil bearing 50. FIG. 8 is a section view along section line 8-8 of FIG. 7. These figures do not show a center shaft, but rather the bearing assembly 50 having a bore through its middle to contain a shaft.

The mid portion of bearing 50 (the portion contained within sleeve 13 and not within sleeve extensions 13a) has a bump foil structure that operates like that illustrated in FIGS. 1-3. This bearing structure comprises a sleeve 13, top foil 15, and bump foil 16. These elements are arranged in the manner described above, except that the top foil 15 extends beyond the axial length of sleeve 13 on either side.

A sleeve extension 13a is attached to both ends of sleeve 13. Thus, bearing 50 has two sleeve extensions 13a, one on each end of its axial length. Within each sleeve extension 13a is contained a pair of opposing brush rings 54 and 56.

In this example of this description, sleeve extensions 13a are removable. As a result, a brush ring 54 or 56 can be easily replaced by replacing a sleeve extension 13a, together with its brush rings 54 and 56, as a unit.

Each of the two sleeve extensions 13a is attached to sleeve 13 by means such as bolts 52. Furthermore, the sleeve extension 13a can be in multiple pieces, as illustrated, for further ease of replacement. Alternatively, each sleeve extension 13a could be a single assembly.

In other embodiments, sleeve extensions 13a could be integral with sleeve 13. Also, as explained below, in some embodiments, the brush rings 54 and 56 within a sleeve extension 13a could be separable and replaceable apart from the sleeve extension.

Referring in particular to FIGS. 5 and 8, the inner assembly of each sleeve extension 13a comprises an inner brush ring 54 and an outer brush ring 56. The "inner" and "outer" designations are relative to the extended portions of top foil 15, which brush rings 54 and 56 surround.

Inner brush ring 54 is attached to, or otherwise secured on, top foil 15 outboard of its associated bump foil area. In other words, inner brush ring 54 is attached to the extended portion of top foil 15. Inner brush ring 54 comprises a backing 54b with an array of bristles 54a. The backing 54b provides a surface for attachment of brush ring 54 to the top foil. The bristles 54a extend outwardly (toward the outer circumference of bearing 50) from the top foil 15.

Outer brush ring 56 is attached to or otherwise secured on the inner surface of sleeve extension 13a. Outer brush ring 56 comprises a backing 56b with an array of bristles 56a. The backing 56b provides a surface for attachment of brush ring 56 to the sleeve extension. The bristles 56a extend inwardly (away from the outer circumference of bearing 50) toward the top foil 15.

The use of a brush with a backing facilitates replacement of the brush ring 54 or 56. However, in other embodiments, the bristles may be attached directly to sleeve extension 13a or top foil 15 without a backing. Regardless of the attachment, each brush ring 54 or 56 is or has a cylindrical (or approximately cylindrical, depending on other aspects of the bearing design) "brush" in the form of a dense array of bristles, which face inward in the case of the outer brush ring 56 or outward in the case of the inner brush ring 54. The two brushes (one of each ring) oppose and engage when the brush rings 54 and 56 are installed within sleeve extension 13a.

Referring in particular to FIG. 8, which is a cross-sectional view along the axial dimension of the bearing assembly 50, the center region is the bump foil bearing region similar to that of FIG. 3. However, bearing assembly 50 has a brush damper region on each side of the center region, in which the bristles of the inner brush ring 54 (attached to the top foil) engage with the bristles of the outer brush ring 56.

Figure 9:
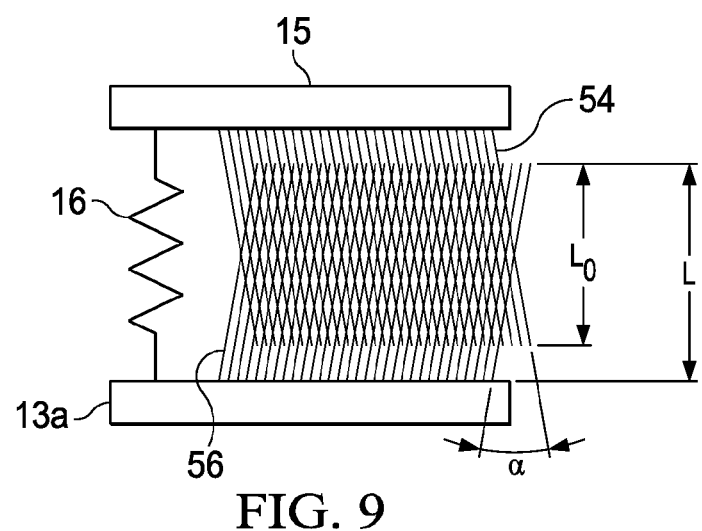
FIG. 9 illustrates the engagement of the bristles of the brush rings of FIGS. 5-8.

FIG. 9 illustrates the engagement of the bristles of the brush rings 54 and 56 of FIGS. 5-8. Brush rings 54 and 56 are represented by their bristles. As illustrated, brush rings with bristles are attached to both the inner surface of sleeve 13a and the outer surface of top foil 15. Bump foil layer 16 is represented schematically as a spring, and the various above-described alternatives for a bump foil layer may be generally referred to as a "compliant layer". The brush rings are interposed and their bristles are meshed together ("interlocking") so that relative motion of the sleeve extension 13a and top foil 15 is dampened via friction between the numerous bristle contacts.

The bristles of brush rings 54 and 56 may have varying design parameters, such as bristle material, size of damper area and bristle density (i.e., bristles per unit area), bristle angle ($\alpha$), bristle shape (cross-section and size), bristle length (L), and length of engagement ($L_0$).

Depending on the working temperature of potential applications, the bristles could be various materials, such as metal, polymer, or elastomer. Brush rings 54 and 56 could use the same or differing materials for each of their brushes. An additional feature of the brush rings is that the bristles can act as pin fins for enhanced cooling capacity of the bearing, with appropriate selection of materials.

In typical embodiments, the bristles of the brush rings are not parallel, but rather at slight opposing angles, i.e., they are "near-parallel". The bristle angle, $\alpha$, may be controlled as a design parameter to provide more stiffness influence. A suitable range of angles is expected to be 0-20 degrees.

Due to the near-parallel orientation of the opposing bristles of the brush damper, the overall stiffness of the structure may be influenced by the elastic stiffness of the bristles. The design is such that there is the ability to increase damping while having a minimal increase in stiffness. Therefore, compliant support structure stiffness, i.e., that of the bump foil layer 16, may be designed more independently of the damping mechanism. This feature of the design is advantageous when designing gas bearings for high performance microturbomachines or other structures requiring structural damping.

As stated above, with a simple attachment to sleeve 13, such as by bolting to the face of sleeve 13 as in FIG. 5, replacement of a brush ring is a simple task. The entire sleeve extension and brush rings can be replaced, or alternatively, the bristles of brush rings 54 and 56 would be attached to their backing in a manner that allows each brush ring to be installed within its sleeve extension.

As indicated above, the use of singular pieces or multiple parts for the various bearing elements is a design choice. Thus, the compliant layer, top foil layer, sleeve extension and brush may be each a singular piece, or alternatively and equivalently, may comprise multiple pieces.

Figure 10:
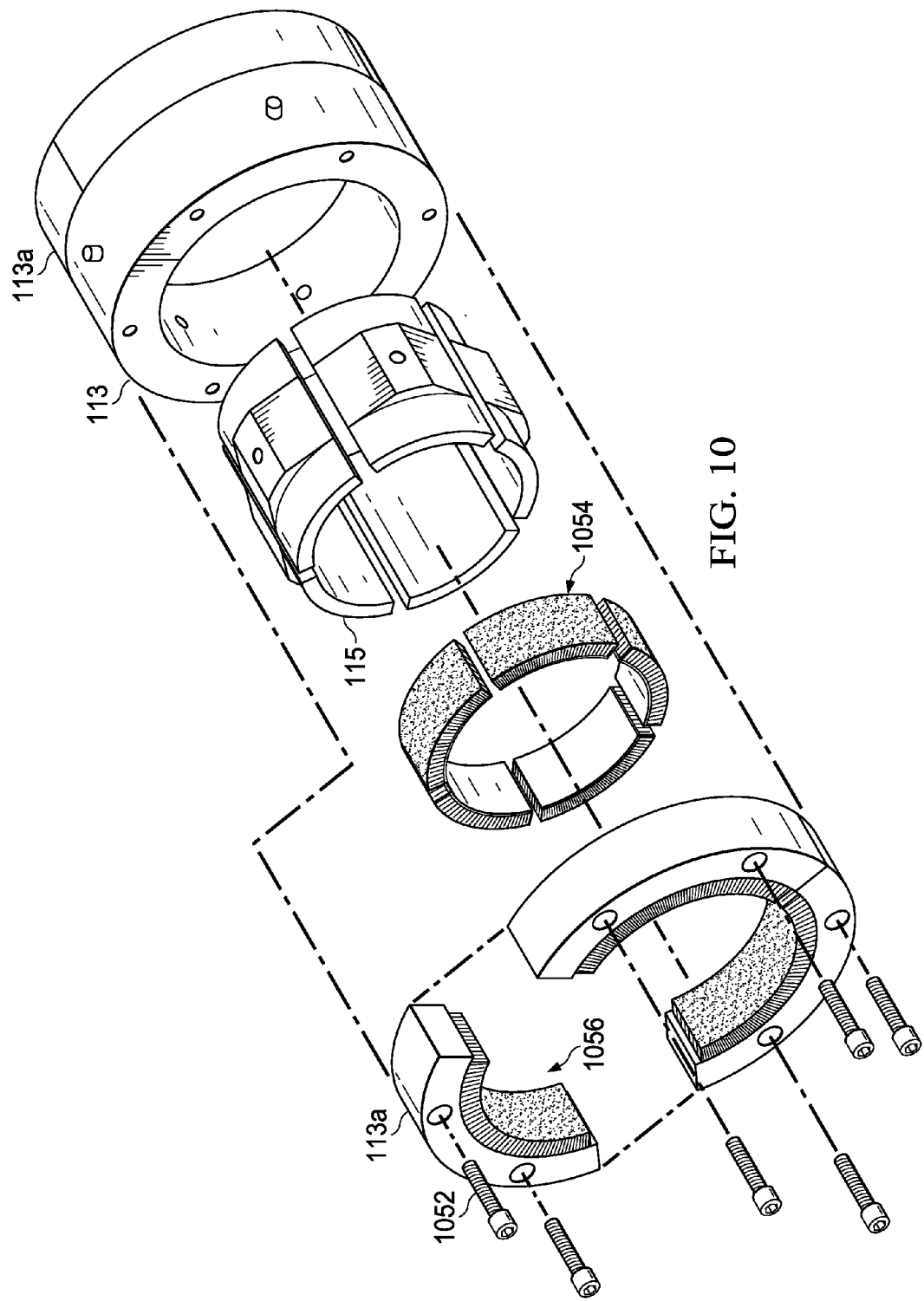
FIG. 10 illustrates a modification of FIG. 5, in which the bearing mechanism is a tilt-pad bearing rather than a foil bearing.

FIG. 10 illustrates a modification of FIG. 5, in which the bearing mechanism is a tilt-pad bearing rather than a foil bearing. The tilt-pad bearing is shown in a simple representative form, and comprises at least sleeve 113 and tilt pads 115.

The tilt pads 115 extend beyond sleeve 113 and provide an attachment surface for inner brush ring 1054. The outer brush ring 1056 is attached to sleeve extension 113a. These brush rings have a structure and operation equivalent to the above description. In the same manner as described above, the brush rings 1054 and 1056 operate to dampen the motion of the tilt pads.

The tilt-pad bearing of FIG. 10 represents a simple type of pivot tilt-pad bearing, and in particular, a ball-socket pivot tilt-pad bearing. Other types of tilt-pad bearings are rocker and flexure pivot tilt-pad bearings. It should be understood that the same concepts could be extended to other types of tilt-pad bearings.

In FIG. 10 and its equivalents, a pad-like bearing mechanism can provide a mounting surface for the inner brush ring, in a manner analogous to the top foil 15 of FIG. 5. However, other means of attaching the inner brush ring are possible. In general, an inner brush ring can be attached to a circumferential surface of a bearing mechanism that is relatively compliant during rotation of the shaft, and thus benefits from the damping provided by the interposed bristles of the interfacing (inner and outer) brush rings. Bristles attached to two interfacing brush rings are meshed together such that relative motion of the shaft and a bearing surface causes energy dissipation via friction between the numerous bristle contacts.

In all embodiments, an advantage of the brush rings is that the brush damping allows weaker coupling between stiffness and damping properties than offered by existing mechanisms for structural damping in bearings.

What is claimed is:

1. A foil gas bearing for a rotating shaft, comprising:
    a hollow sleeve having an inner surface;
    a compliant layer surrounding the inner surface of the hollow sleeve;
    a top foil layer inside the compliant layer; wherein the compliant layer supports the top foil layer during rotation of the shaft by means of a spring structure;
    wherein the top foil layer extends beyond the sleeve on at least one end of the sleeve;
    a sleeve extension over the portion of the top foil layer that extends beyond the sleeve, the sleeve extension having an inner surface
    an inner brush ring on the outer surface of the top foil layer and having bristles that extend outwardly from the top foil layer; and
    an outer brush ring on the inner surface of the sleeve extension and having bristles that extend inwardly from the sleeve extension;
    wherein the bristles of the inner brush ring and the bristles of the outer brush ring are interposed.

2. The bearing of claim 1, wherein the compliant layer comprises one of the following: a bump foil layer, a metal mesh layer, or a leaf spring layer.

3. The bearing of claim 1, wherein the top foil layer extends beyond the sleeve on both ends of the sleeve, and each end of the sleeve has a sleeve extension, an inner brush ring, and an outer brush ring.

4. The bearing of claim 1, wherein the sleeve extension, the inner brush ring, and the outer brush ring are removably attached.

5. The bearing of claim 1, wherein the bristles of the inner brush ring are parallel to the bristles of the outer brush ring.

6. The bearing of claim 1, wherein the bristles of the inner brush ring are interposed with the bristles of the outer brush ring within a bristle angle range of 0 to 20 degrees.

7. The bearing of claim 1, wherein the bristles of the inner brush ring, or the outer brush ring, or both, are attached with a backing.

8. A tilt-pad bearing for a rotating shaft, comprising:
a tilt-pad bearing mechanism having at least a hollow sleeve and a ring of pads proximate the inner surface of the sleeve, the ring of pads having an outer surface, and the pads operable to generally comply with the motion of the rotating shaft by tilting;
wherein the pads extend beyond the sleeve on at least one end of the sleeve;
a sleeve extension over the portions of the pads that extend beyond the sleeve, the sleeve extension having an inner surface;
an inner brush ring on the outer surface of the ring of pads where the pads extend beyond the sleeve, and having bristles that extend outwardly from the ring of pads; and
an outer brush ring on the inner surface of the sleeve extension and having bristles that extend inwardly from the sleeve extension;
wherein the bristles of the inner brush ring and the bristles of the outer brush ring are interposed.

9. The bearing of claim 8, wherein the pads extend beyond the sleeve on both ends of the sleeve, and each end of the sleeve has a sleeve extension, an inner brush ring, and an outer brush ring.

10. The bearing of claim 8, wherein the sleeve extension, the inner brush ring, and the outer brush ring are removably attached.

11. The bearing of claim 8, wherein the bristles of the inner brush ring are parallel to the bristles of the outer brush ring.

12. The bearing of claim 8, wherein the bristles of the inner brush ring are interposed with the bristles of the outer brush ring within a bristle angle range of 0 to 20 degrees.

13. The bearing of claim 8, wherein the bristles of the inner brush ring, or the outer brush ring, or both, are attached with a backing.

14. The bearing of claim 8, wherein the tilt-pad bearing mechanism is one of the following types of bearing mechanisms: a pivot pad bearing, a rocker pad bearing, or a flexure pad bearing.

* * * * *